United States Patent
Nonaka

(10) Patent No.: US 8,556,022 B2
(45) Date of Patent: Oct. 15, 2013

(54) SOLENOID VALVE, SOLENOID AND HYDRAULIC POWER SYSTEM

(75) Inventor: Satoshi Nonaka, Yokote (JP)

(73) Assignee: Hitachi Automotive Systems Steering, Ltd., Hiki-gun (JP)

(*) Notice: Subject to any disclaimer, the term of this patent is extended or adjusted under 35 U.S.C. 154(b) by 0 days.

(21) Appl. No.: 13/466,325

(22) Filed: May 8, 2012

(65) Prior Publication Data

US 2013/0025959 A1 Jan. 31, 2013

(30) Foreign Application Priority Data

Jul. 28, 2011 (JP) .................................. 2011-165128

(51) Int. Cl.
  *B62D 5/06* (2006.01)
  *B62D 5/083* (2006.01)

(52) U.S. Cl.
  CPC .............. *B62D 5/083* (2013.01); *B62D 5/062* (2013.01)
  USPC ....................... 180/441; 180/442; 137/315.03

(58) Field of Classification Search
  USPC ............. 137/315, 315.03; 180/421, 442, 441
  See application file for complete search history.

(56) References Cited

U.S. PATENT DOCUMENTS

| 4,655,249 A * | 4/1987 | Livet .......................... 137/625.5 |
| 5,769,386 A * | 6/1998 | Sugiura et al. .................. 251/37 |
| 7,017,885 B2 * | 3/2006 | Hirata et al. ............. 251/129.15 |
| 2011/0268595 A1 * | 11/2011 | Yamamuro et al. ............. 418/23 |

FOREIGN PATENT DOCUMENTS

JP  2002-364533 A  12/2002

\* cited by examiner

*Primary Examiner* — J. Allen Shriver, II
*Assistant Examiner* — Felicia L Brittman
(74) *Attorney, Agent, or Firm* — Foley & Lardner LLP

(57) ABSTRACT

In order to provide a solenoid valve or solenoid that allows easy and accurate wire winding for an electric annular coil employed therein, a simple shape is possessed by the electric annular coil with inner and outer cylindrical surfaces that entirely extend in parallel with an axis of the electric annular coil and a sleeve for axially sliding therein an armature together with a plunger is shaped to have a larger diameter portion that is put between a smaller diameter portion of a front core and the inner cylindrical surface of the electric coil, a smaller diameter portion that is put between the armature and a rear core integral with a solenoid housing and a sloped annular intermediate portion that extends between the larger and smaller diameter portions.

17 Claims, 2 Drawing Sheets

SOLENOID VALVE, SOLENOID AND HYDRAULIC POWER SYSTEM

BACKGROUND

The present invention relates in general to a solenoid valve, a solenoid and a hydraulic power system, and more particularly to the solenoid valve, solenoid and hydraulic power system that can be practically used in a hydraulic power steering system of a motor vehicle. More particularly, the present invention is concerned with a solenoid valve that is constructed to enable an easy and accurate wire winding of an electric coil installed therein.

In order to clarify the present invention, one related art of the invention will be briefly described with reference to Japanese Laid-open Patent Application (tokkai) 2002-364533.

This Laid-open Patent Application shows a solenoid valve (viz., electromagnetic control valve), that includes a cylindrical plunger case, a plunger axially movably received in the plunger case, a coil spring constantly biasing the plunger in a valve close direction, and an electric coil coaxially disposed around the plunger. Upon application of certain amount of electric power to the electric coil, the plunger is moved axially to a desired position against the biasing force of the coil spring thereby to control an open degree of the valve.

SUMMARY

In the solenoid valve disclosed in the above-mentioned Laid-open Patent Application, there are further employed a hollow attraction member that has the plunger slidably received therein and a cylindrical magnetic guide member that is coaxially disposed on the plunger case to effectively transmit the magnetic force produced by the electric coil to the hollow attraction member.

However, provision of the magnetic guide member causes the electric coil to have at its inner cylindrical wall portion an annular recess for receiving therein a major cylindrical part of the magnetic guide member. However, due to provision of the annular recess, the electric coil has inevitably a complex shape, which makes the work for winding a wire around a given axis for producing the electric coil difficult. Of course, such difficult work tends to induce not only lowering of the wire winding accuracy but also rise of production cost.

It is therefore an object of the present invention to provide a solenoid valve which is free of the above-mentioned drawback.

According to the present invention, there is further provided a solenoid that can be used as an element of the solenoid valve.

According to the present invention, there is further provided a hydraulic power system used in a hydraulic power steering system of a motor vehicle, which can practically employ the above-mentioned solenoid valve and the solenoid.

In accordance with a first aspect of the present invention, there is provided a solenoid valve which comprises a solenoid housing including longer outer and shorter inner cylindrical walls between which a coil receiving cylindrical space is defined, the solenoid housing having a head portion at one axial end thereof and an opened base portion at the other axial end thereof, the inner cylindrical wall being formed at an inner surface thereof with an annular recess leaving a cylindrical outer wall that serves as a rear core; an annular coil disposed in the coil receiving cylindrical space, the annular coil including cylindrical inner and outer surfaces that extend in parallel with an axis of the annular coil; a front core disposed in the opened base portion of the solenoid housing, the front core having a smaller diameter portion projected into the inner cylindrical wall of the solenoid housing, the front core being formed at the smaller diameter portion thereof with an axially extending through bore; a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions; a plunger axially slidably received in the axially extending through bore of the front core, the plunger having a first portion projected into the smaller diameter portion of the sleeve and a second portion projected outward; an armature secured to the first portion of the plunger to move together therewith; a spring biasing the plunger toward the outside of the solenoid housing; and a valve unit actuated by the second portion of the plunger, the valve unit including a valve housing connected to an outside of the front core, a spool slidably received in the valve housing and having an end that is in contact with the second portion of the plunger, and a spring for biasing the spool toward the second portion of the plunger.

In accordance with a second aspect of the present invention, there is provided a solenoid which comprises a solenoid housing including longer outer and shorter inner cylindrical walls between which a coil receiving cylindrical space is defined, the solenoid housing having a head portion at one axial end thereof and an opened base portion at the other axial end thereof, the inner cylindrical wall being formed at an inner surface thereof with an annular recess leaving a cylindrical outer wall that serves as a rear core; an annular coil disposed in the coil receiving cylindrical space, the annular coil including cylindrical inner and outer surfaces that extend in parallel with an axis of the annular coil; a front core disposed in the opened base portion of the solenoid housing and having a smaller diameter portion projected into the inner cylindrical wall of the solenoid housing, the front core being formed at the smaller diameter portion thereof with an axially extending through bore; a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions; a plunger axially slidably received in the axially extending through bore of the front core, the plunger having a first portion projected into the smaller diameter portion of the sleeve and a second portion projected outward; an armature secured to the first portion of the plunger to move together therewith; and a spring biasing the plunger toward the outside of the solenoid housing.

In accordance with a third aspect of the present invention, there is provided a hydraulic power system used in a steering power steering system for a motor vehicle, which comprises a variable capacity pump for feeding a power cylinder with a pressurized hydraulic fluid to assist a steering work applied to a steering wheel, the variable capacity pump including a pump housing, a drive shaft rotatably held in the pump housing, a cam ring movably received in a pump element receiving recess formed in the pump housing, a rotor arranged in the cam ring and driven by the drive shaft, vanes axially movably held by the rotor while causing tops of the vanes to slidably contact with an inner surface of the cam ring, and a solenoid valve that controls the eccentricity of the cam ring, the solenoid valve including a solenoid housing including longer outer and shorter inner cylindrical walls between which a coil receiving cylindrical space is defined, the solenoid housing having a head portion at one axial end thereof and an opened base portion at the other axial end thereof, the inner cylindrical wall being formed at an inner surface thereof with an annular recess leaving a cylindrical outer wall that serves as a rear core; an annular coil disposed in the coil receiving cylindrical space, the annular coil including cylindrical inner and outer surfaces that extend in parallel with an axis of the annular coil; a front core disposed in the opened base portion of the solenoid housing, the front core having a smaller diameter portion projected into the inner cylindrical wall of the solenoid housing, the front core being formed at the smaller diameter portion thereof with an axially extending through bore; a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions; a plunger axially slidably received in the axially extending through bore of the front core, the plunger having a first portion projected into the smaller diameter portion of the sleeve and a second portion projected outward; an armature secured to the first portion of the plunger to move together therewith; a spring biasing the plunger toward the outside of the solenoid housing; and a valve unit actuated by the second portion of the plunger, the valve unit including a valve housing connected to an outside of the front core, a spool slidably received in the valve housing and having an end that is in contact with the second portion of the plunger, and a spring for biasing the spool toward the second portion of the plunger.

BRIEF DESCRIPTION OF THE DRAWINGS

Other objects and advantages of the present invention will become apparent from the following description when taken in conjunction with the accompanying drawings, in which.

DETAILED DESCRIPTION

In the following, the present invention will be described in detail with reference to the accompanying drawings.

In the following description, various directional terms, such as right, left, upper, lower, rightward and the like are used for ease of explanation. It is however to be noted that such terms are to be understood with respect to only a drawing or drawings on which a corresponding element or portion is shown.

[Hydraulic Power Steering System]

Figure 1:
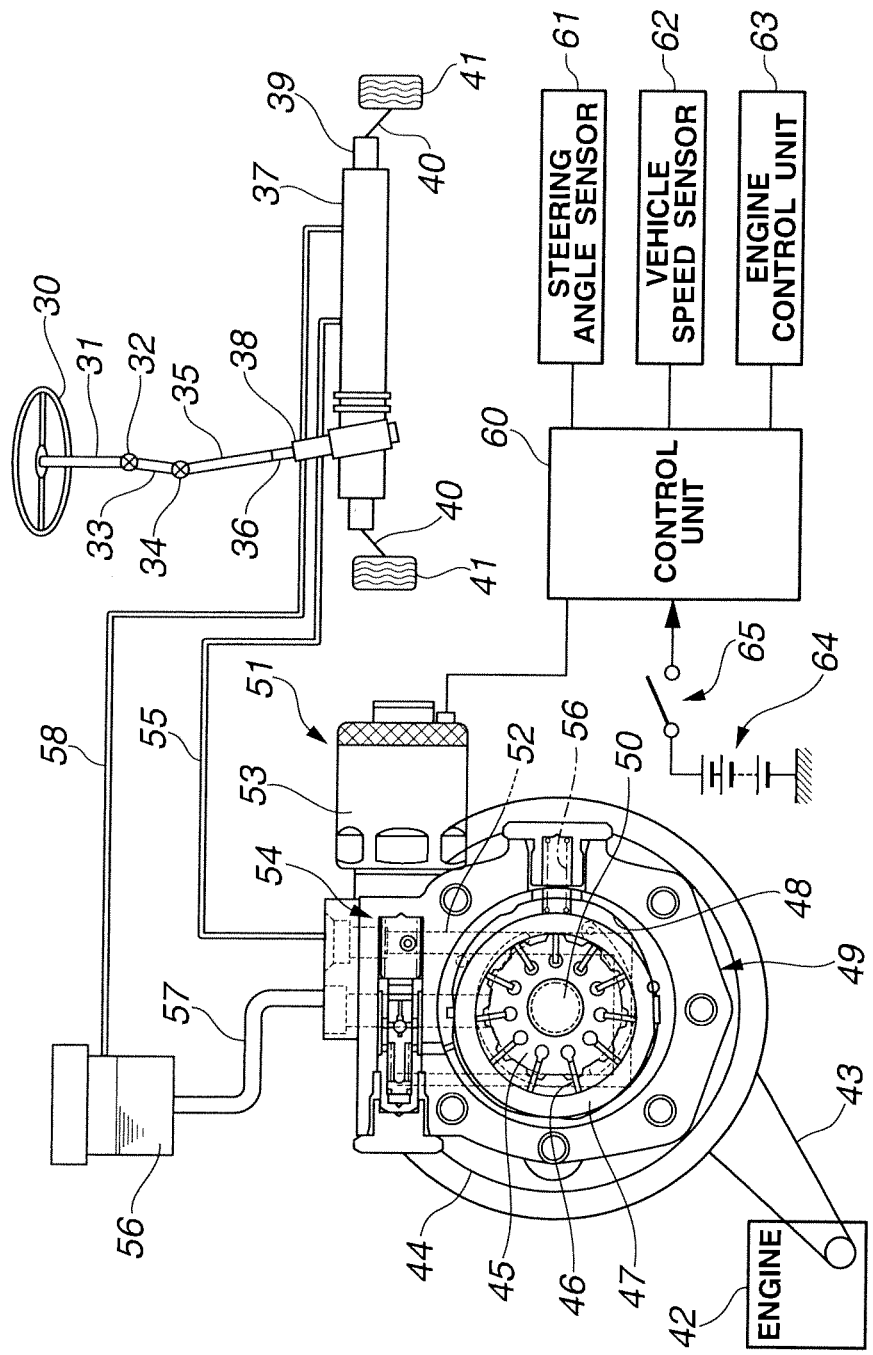
FIG. 1 is a schematic view of a hydraulic power steering system of a motor vehicle to which a solenoid valve, a solenoid and a hydraulic power system according to the present invention are practically applied.

Referring to FIG. 1, there is schematically shown a hydraulic power steering system that has a solenoid valve, a solenoid and a hydraulic power system of the present invention practically installed therein.

Denoted by numeral 30 is a steering wheel of an associated motor vehicle, to which a steering shaft 31 is connected to rotate therewith. To steering shaft 31, there is connected an upper-side intermediate shaft 33 through a universal joint 32, and to upper-side intermediate shaft 33, there is connected a lower-side intermediate shaft 35 through a universal joint 34. To lower-side intermediate shaft 35, there is connected a pinion shaft 36.

To pinion shaft 36, there is connected a pinion (not shown) through a hydraulic control valve 38 that carries out a hydraulic control of a power cylinder 37. Hydraulic control valve 38 functions to change or control hydraulic passages and hydraulic feed rate to the hydraulic passages in accordance with a steering torque produced when the driver steers steering wheel 30.

The pinion (not shown) is meshed with a rack shaft 39 that is axially movably received in power cylinder 37. That is, upon rotation of the pinion in accordance with a steering angle by which the driver turns steering wheel 30, rack shaft 39 is shifted rightward or leftward (in FIG. 1) in power cylinder 37.

For the rack shaft shifting, rack shaft 39 has a piston in power cylinder 37, so that power cylinder 37 has therein left and right power chambers that are partitioned by the piston. In case of shifting rack shaft 39 leftward, the right power chamber is fed with a hydraulic pressure, and in case of shifting rack shaft 39 rightward, the left power chamber is fed with the hydraulic pressure. With such feeding of hydraulic pressure to a selected power chamber, the steering torque is assisted. Axially ends of rack shaft 39 are connected to road wheels 41 through respective tie rods 40, and thus road wheels 41 are steered rightward or leftward with the aid of the hydraulic power in accordance with the steering operation by the driver.

Denoted by numeral 42 is an internal combustion engine of the associated motor vehicle. The engine 42 is equipped with an oil pump 44 that is driven or powered by a crankshaft through a belt 43. Oil pump 44 is a variable capacity vane pump which comprises a rotor 45 that rotates in synchronization with rotation of the engine, a plurality vanes 46 that are axially movably received in slots formed in rotor 45, a cam ring 47 that surrounds the vanes 46 and is movable to a desired eccentric position relative to a rotation center of rotor 45, and a pump housing 49 that has a pump element receiving recess 48 for operatively receiving rotor 45, vanes 46 and cam ring 47. Pump housing 49 rotatably supports, through a bearing, a drive shaft 50 that drives rotor 45. To pump housing 49, there is connected a solenoid valve 51 that controls the eccentricity of cam ring 47. Solenoid valve 51 is of a proportional type.

Oil pump 44 has an outlet passage 52 to which a metering orifice (not shown) is connected. Opening of the metering orifice is variably controlled by a solenoid 53.

A control valve 54 comprises a control chamber that is placed at a left position of the control valve 54 in FIG. 1 to feed a hydraulic pressure to a clearance defined between an outer wall of cam ring 47 and an inner wall of pump housing 49 and a discharge pressure chamber that is placed at a right position of the control valve 54 in FIG. 1 to receive a discharge pressure. The control chamber communicates with an upstream side of the metering orifice and the discharge pressure chamber communicates with a downstream side of the metering office, that is, a high pressure oil supply passage 55.

In an initial stage, cam ring 47 takes the most eccentric position due to a biasing force of a spring 56. The hydraulic pressure led into the control chamber changes in accordance with a rotation speed of rotor 45, which controls the eccentricity of cam ring 47. By controlling the opening of the metering orifice, the discharge flow characteristic (or variation character of eccentricity) to pump rotation can be changed, and at the same time, the torque needed for driving oil pump 44 can be changed.

Oil pump 44 is provided with an oil feeding passage 57 that sucks a hydraulic fluid from a reservoir tank 56, a high pressure oil feeding passage 55 that feeds the above-mentioned hydraulic control valve 38 with the high discharge pressure from oil pump 44, an oil returning passage 58 that returns the hydraulic fluid from hydraulic control valve 38 to reservoir tank 56. When a certain valve operation is carried out in hydraulic control valve 38 in accordance with the steering torque, high pressure oil supply passage 55 and oil returning passage 58 change their connection to the left and right power chambers of the power cylinder 37.

Into a control unit 60, there are inputted an information from a steering angle sensor 61 that detects the steering angle of steering wheel 30, an information from a vehicle speed sensor 62 that detects a speed of an associated motor vehicle and an information from an engine control unit 63 that controls engine 42. The information from engine control unit 63 includes an information used for judging whether cranking is being carried out by a cell motor or not, an engine speed, etc.

Control unit 60 is connected to a battery 64 through an ignition switch 65, as shown. When ignition switch 65 is turned ON, control unit 60 is energized and a given control operation is carried out by control unit 60. In common motor vehicles powered by an internal combustion engine, the cranking for starting the engine starts when a key for the ignition switch is turned further exceeding an ignition ON position and continued for a certain time. Some of the motor vehicles are equipped with a push bottom starter which cranks and starts the engine when pushed.

By processing the steering angle detected by steering angle sensor 61, the vehicle speed detected by vehicle speed sensor 62 and the engine speed issued from engine control unit 63, control unit 60 calculates a solenoid valve driving current (viz., target current value) and controls a current (or amount of electric power) fed to solenoid valve 51 based on the target current value.

[Construction of Solenoid Valve 51]

Figure 2:
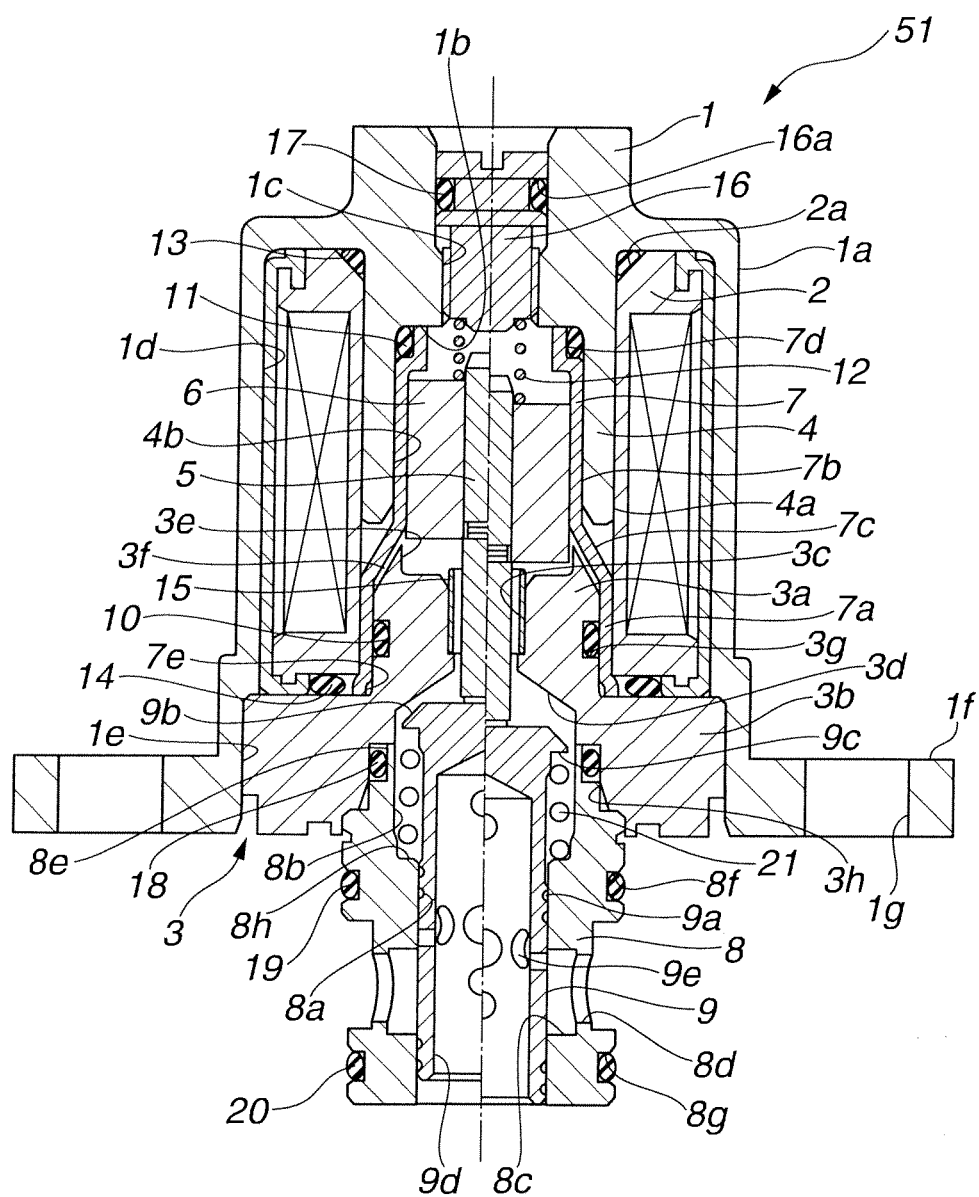
FIG. 2 is an enlarged sectional view of the solenoid valve of the present invention.

Referring to FIG. 2, there is shown solenoid valve 51 in a sectioned manner. In the drawing, a left half shows a condition in which no electric power is applied to electric coil 2, while a right half shows a condition in which a certain amount of electric power is applied to electric coil 2.

As shown in the drawing, solenoid valve 51 comprises a solenoid housing 1, the above-mentioned electric coil 2 installed in solenoid housing 1, a front core 3 that is positioned at a lower position of coil 2 and forms a magnetic path for a magnetic field produced by electric coil 2, a rear core 4 (namely, inner cylindrical wall integral with solenoid housing 1) that is coaxial with and positioned above front core 3, an axially movable armature 6 that forms a magnetic path for the magnetic field produced by electric coil 2, a plunger 5 axially movable with armature 6, a sleeve 7 that is made of a non-magnetic material and slidably receives therein armature 6, a valve housing 8 having therein a fluid passage 8b, and a spool 9 that controls a flow of the hydraulic fluid in valve housing 8.

In the following, the detail of each element of solenoid valve 51 will be described.

[Solenoid Housing 1]

Solenoid housing 1 is made of a magnetic material and has a hollow cylindrical portion 1a. As shown, hollow cylindrical portion 1a has a double wall structure that includes outer and inner cylindrical walls concentrically arranged. As shown, inner cylindrical wall is shorter than outer cylindrical wall. Outer and inner cylindrical walls extend upward to constitute a thicker head part of solenoid housing 1. The thicker head part has an annular bottom surface 1b.

As shown, a central cylindrical space is defined in inner cylindrical wall, which comprises a smaller diameter upper space 1c and a larger diameter lower space 4b that are partitioned by an imaginary plane that is merged with the annular bottom surface 1b. Smaller diameter upper space 1c is defined by a cylindrical inner wall is of which lower part is internally threaded. Meshed with threaded inner wall 1c is an adjusting screw 16 that is formed with an annular recess 16a to receive therein an annular seal member 17. With this seal member 17, adjusting screw 16 is sealed to the inner wall of upper space 1c.

As shown, between the outer and inner cylindrical walls of hollow cylindrical portion 1a, there is defined a cylindrical space 1d for receiving therein electric coil 2, and an annular flange 1f is integrally connected to a lower end of the outer cylindrical wall. Annular flange 1f is formed with a plurality of bolt openings 1g. Solenoid valve 51 is secured to the above-mentioned pump housing 49 (see FIG. 1) by bolts that pass through bolt openings 1g.

[Rear Core 4]

Referring back to FIG. 2, rear core 4 is a part of solenoid housing 1 and thus made of a magnetic material. As is seen from the drawing, rear core 4 is a part of the above-mentioned shorter inner cylindrical wall of solenoid housing 1. A lower end of rear core 4 is denoted by numeral 4a. As is mentioned hereinabove, the larger diameter lower space of solenoid housing 1 is denoted by numeral 4b.

As shown, the lower end 4a of rear core 4 is tapered in such a manner that an inner diameter gradually reduces as the distance from annular bottom surface 1b reduces.

[Electric Coil 2]

As is described hereinabove, electric coil 2 is snugly received in cylindrical space 1d defined between the outer and inner cylindrical walls of hollow cylindrical portion 1a of solenoid housing 1. It is to be noted that coil 2 has a simple cylindrical shape. That is, coil 2 has inner and outer cylindrical surfaces that are coaxial and entirely extend in parallel with an axis of coil 2. As is known, when an electric power is applied to electric coil 2, coil 2 produces a magnetic field.

As is seen from FIG. 2, between the bottom of coil receiving cylindrical space 1d and the upper end of coil 2, there is compressed an annular seal member 13. For suitably receiving the annular seal member 13, coil 2 is formed at its inside upper edge with an annular cut 2a.

[Sleeve 7]

Sleeve 7 is made of a non-magnetic material and comprises a smaller diameter upper portion 7b, a larger diameter lower portion 7a and a sloped annular intermediate portion 7c through which smaller diameter upper portion 7b and larger diameter lower portion 7a are integrally connected.

As shown, smaller diameter upper portion 7b is intimately received in the larger diameter lower space 4b having the intermediate and lower portions 7c and 7a exposed to a larger diameter space defined in a lower portion of solenoid housing 1. Between the annular bottom surface 1b and an upper end of smaller diameter upper portion 7b, there is pressed an annular seal member 11. For suitably receiving the annular seal member 11, an upper end of smaller diameter upper portion 7b is formed with an annular recess 7d, as shown. In case of assembly, the smaller diameter upper portion 7b is inserted into larger diameter lower space 4b together with annular seal member 11 kept put in the annular recess 7d. As shown, upon assembly, smaller diameter upper portion 7b becomes in intimate contact with the inner surface of the larger diameter lower space 4b, and at the same time, the upper end of the smaller diameter upper portion 7b becomes in intimate contact with the annular bottom surface 1b. Due to annular seal member 11, there is established a hermetical sealing between rear core 4 and sleeve 7.

As shown, sloped annular intermediate portion 7c of sleeve 7 is shaped to gradually increase its diameter as a distance to larger diameter lower portion 7a reduces. Larger diameter lower portion 7a is tightly put between a lower portion of the inner cylindrical wall of coil 2 and an after-mentioned smaller diameter portion 3a of the front core 3. A lower open end of sleeve 7 is denoted by numeral 7e.

[Plunger 5, Armature 6]

Plunger 5 is made of a non-magnetic material and shaped cylindrical. Armature 6 is made of a magnetic material and shaped cylindrical and tightly connected to an upper portion of plunger 5 to move therewith. Armature 6 is axially slidably received in smaller diameter upper portion 7b of sleeve 7. That is, sleeve 7 serves as a guide for guiding the axial movement of armature 6. Since sleeve 7 is made of a non-magnetic material, a so-called "magnetization stiction" of armature 6 to rear core 4 is suppressed. Between plunger 5 and the above-mentioned adjusting screw 16, there is compressed a coil spring 12. With this coil spring 12, plunger 5 is biased downward in the drawing. When adjusting screw 16 is turned by a certain angle, the biasing force produced by coil spring 12 changes.

[Front Core 3]

As is seen from FIG. 2, front core 3 is positioned at a coaxial lower position of the above-mentioned rear core 4. More specifically, rear core 4 and front core 3 are coaxially placed in upper and lower positions of solenoid housing 1 respectively. Front core 3 is made of a magnetic material and functions to form a magnetic path for the magnetic field produced by coil 2.

As shown, front core 3 comprises a smaller diameter upper portion 3a that is concentrically placed within a lower part of coil 2 and a larger diameter lower portion 3b that is arranged to put thereon coil 2 and integral with smaller diameter upper portion 3a.

As shown, an upper portion of smaller diameter upper portion 3a is formed with an annular recess (or armature receiving recess) 3e for slidably receiving a lower portion of the cylindrical armature 6. The upper portion of smaller diameter upper portion 3a has a tapered outer surface 3f matched with sloped annular intermediate portion 7c of the above-mentioned sleeve 7.

As shown, smaller diameter upper portion 3a is intimately received in larger diameter lower portion 7a of sleeve 7. Between smaller diameter upper portion 3a and larger diameter lower portion 7a of sleeve 7, there is compressed an annular seal member 10 that is received in an annular recess 3g formed in smaller diameter upper portion 3a. Due to provision of seal member 10, there is established a hermetical sealing between smaller diameter upper portion 3a and larger diameter lower portion 7a of sleeve 7.

As shown, larger diameter lower portion 3b of front core 3 is tightly received in a cylindrical recess 1e formed in a lower end portion of solenoid housing 1. Under this condition, an axial length of sleeve 7 is slightly smaller than an axial distance between bottom surface 1b of the thicker head part of solenoid housing 1 and the annular upper surface of larger diameter lower portion 3b of front core 3.

Between the annular upper surface of larger diameter lower portion 3b and a lower end of coil 2, there is compressed a seal member 14 by which a hermetical sealing therebetween is achieved. It is to be noted that compressibility of seal member 14 is higher than that of the above-mentioned seal member 13.

Front core 3 is formed with a coaxial bore 3c through which the above-mentioned plunger 5 slidably passes. A cylindrical stop member 15 made of a non-magnetic material is tightly received in coaxial bore 3c with its upper end projected upward but slightly. The projected upper end of the stop member 15 serves as a stopper for armature 6.

That is, within a cylindrical space defined by both smaller diameter upper portion 7b of sleeve 7 and annular recess (or armature receiving recess) 3e of front core 3, there is axially movably received armature 6. As is mentioned hereinabove, armature 6 is connected to the upper portion of plunger 5. Thus, the axial movement of armature 6 in the cylindrical space causes a synchronous axial movement of plunger 5 in the coaxial bore 3c of front core 3. When moved to its lowermost position, armature 6 is brought into abutment against the projected upper end of stop member 15, and thus, undesired magnetization stiction of armature 6 to front core 3 is suppressed.

For the reasons which will be described hereinafter, a conical oil passage 3d is formed in front core 3, which communicates with coaxial bore 3c. As shown, the diameter of conical oil passage 3d increases as a distance from it's smallest diameter portion increases.

Larger diameter lower portion 3b of front core 3 is formed at its cylindrical inner surface with an annular recess 3h that holds an upper portion of the above-mentioned valve housing 8, as will be described in detail in the following. As shown, the diameter of annular recess 3h is larger than that of conical oil passage 3d.

[Spool 9]

As is shown in FIG. 2, spool 9 is a cylindrical member and comprises a cylindrical main portion 9a and an annular head portion 9b that is integrally formed on an upper end of main portion 9a. Annular head portion 9b is so tapered that the diameter thereof gradually reduces as a distance from the main portion 9a increases. A radially extending annular wall defined between the upper end of main portion 9a and the tapered head portion 9b is denoted by numeral 9c. Annular head portion 9b has an upper flat surface to which a lower end of the above-mentioned plunger 5 abuts.

Spool 9 is formed with an axially extending blind hole that serves as an oil passage 9d. Spool 9 is formed with a plurality of orifices 9e through which the blind hole 9d and the outside of spool 9 are communicated.

[Valve Housing 8]

Valve housing 8 is a generally cylindrical member for axially movably receiving therein spool 9 and has an upper portion tightly received in annular recess 3h of the above-mentioned front core 3. Between the upper portion of valve housing 8 and an inner wall of annular recess 3h of front core 3, there is compressed a seal member 18 that is received in an annular recess 8e formed in the upper end of valve housing 8. Due to provision of seal member 18, a hermetical sealing between valve housing 8 and front core 3 is achieved.

Valve housing 8 is formed with an axially extending through bore for slidably receiving therein spool 9. More specifically, the axially extending through bore comprises a spool receiving lower portion 8a that slidably receives spool 9 and an upper annular recess that constitutes an oil passage 8b. A radially expanding annular wall 8h defined between spool receiving lower portion 8a and the upper annular recess 8b serves as a seat for a coil spring 21. That is, between the seat 8h and the tapered head portion 9b of spool 9, there is compressed the coil spring 21 so that spool 9 is biased upward in the drawing. Due to provision of coil spring 21, the upper flat surface of tapered head portion 9b of spool 9 constantly contacts the lower end of plunger 5.

The spool receiving lower portion 8a of valve housing 8 is formed with an annular groove 8c of which diameter is larger than that of the upper annular recess 8b. The annular groove

8c is formed with a diametrically extending through bore 8d that serves as a discharge bore.

Valve housing 8 is formed at middle and lower portions thereof with annular recesses 8f and 8g for receiving therein seal members 19 and 20 respectively.

Although not shown in the drawing, valve housing 8 is snugly received in a bore portion provided in a hydraulic power steering system of a motor vehicle. Upon this, the two seal members 19 and 20 function to achieve a hermetical sealing between valve housing 8 and an wall that defines the bore portion.

In the following, operation will be described with the aid of FIG. 2.

[Operation of Solenoid Valve 51]

When a certain amount of electric power is applied to electric coil 2, there is produced a magnetic field that passes through solenoid housing 1, rear core 4, armature 6 and front core 3. Upon this, there are produced both a radial attraction force between rear core 4 and armature 6 and an axial attraction force between front core 3 and armature 6, and thus, armature 6 is forced to move in an axial direction together with plunger 5 against a force that is produced by combining coil spring 12 and another coil spring 21. Actually, in operation, amount of electric power fed to electric coil 2 is continuously varied, so that spool 9 is axially moved to control opening degree of orifices 9e relative to annular groove 8c.

[Easy Production of Coil 2]

In order to prevent undesired magnetization stiction of armature 6 to rear core 4, it is effective or necessary to provide between armature 6 and rear core 4 sleeve 7 that is made of non-magnetic material. This means that rear core 4 should be placed outside of sleeve 7. While, when it is needed to produce an axial attraction force between front core 3 and armature 6, it is necessary to locate front core 3 at a position axially spaced from armature 6. In this case, to prevent magnetization stiction of armature 6 to front core 3, sleeve 7 may be placed between armature 6 and front core 3. However, in this case, sleeve 7 has a complex shape. Thus, in the present invention, cylindrical stop member 15 made of a non-magnetic material is used. With this arrangement, front core 3 can be placed inside of sleeve 7.

If desired, coil 2 may be formed on its inner surface with an annular step portion for putting thereon rear core 4. However, provision of such step portion on the inner surface of coil 2 tends to disturb the work for making a smoothed winding of wires around a core, which causes poorness in wire winding accuracy. Thus, in the present invention, sleeve 7 is constructed to have smaller diameter upper portion 7b, larger diameter lower portion 7a and sloped annular intermediate portion 7c, and front core 3 is placed inside of larger diameter lower portion 7a, and rear core 4 is placed outside of smaller diameter upper portion 7b.

With such arrangement, it is possible to provide coil 2 with smoothed inner and outer cylindrical surfaces that entirely extend in parallel with the axis of coil 2. That is, coil 2 can be made simple in shape and thus can be produced with ease. Furthermore, for the same reasons, coil 2 can be downsized.

[Increased Accuracy in Proportional Characteristic of Solenoid Valve 51]

In the present invention, front core 3 is constructed to have armature receiving recess 3e and an annular edge portion with tapered outer surface 3f.

When armature 6 is moved down (in FIG. 2) to the position of the armature receiving recess 3e of front core 3, there is produced, between front core 3 and armature 6, a radial attraction force in addition to an axial attraction force. Due to provision of the tapered outer surface 3f of which diameter gradually increases as the distance from armature 6 increases, the ratio of the radial attraction force to the axial attraction force increases as armature 6 moves upward toward the thicker head part of solenoid housing 1. This means that even when armature 6 approaches front core 3, the rate of increase of the axial attraction force can be controlled small, and thus, accuracy in proportional characteristic of solenoid valve 51 (viz., proportional valve) can be increased.

[Easiness in Assembling Coil 2]

In the present invention, the coil receiving cylindrical space 1d for receiving electric coil 2, the sleeve receiving space 4b for receiving sleeve 7 and the front core receiving space 7e for receiving smaller diameter portion 3a of front core 3 have openings that are all directed downward in FIG. 2 (viz., in the same direction). This allows easy and simple work for assembling coil 2, sleeve 7 and front core 3 in solenoid housing 1.

[Suppression of Radial Deformation of Sleeve 7]

In the present invention, annular seal member 11 is arranged between smaller diameter upper portion 7b of sleeve 7 and rear core 4 in such a manner as to intimately contact with both an outer surface of the portion 7b and an inner surface of rear core 4. Thus, if a hydraulic fluid leaks out from valve housing 8 into sleeve 7, the pressure of the hydraulic fluid in sleeve 7 is transmitted to rear core 4 through the seal member 11. This reduces an external load applied to sleeve 7 thereby suppressing undesired deformation of sleeve 7.

[Suppression of Production of Air Gap Between Rear Core 4 and Sleeve 7]

In the present invention, sleeve 7 is provided with a seal member holding recess (or annular recess) 7d of which diameter is smaller than that of smaller diameter upper portion 7b, and annular seal member 11 is snugly received in the seal member holding recess 7d in such a manner that its inner surface intimately contacts with the outer surface of the holding recess 7d. Due to provision of seal member holding recess 7d, mounting seal member 11 on sleeve 7 does not cause increase in distance between smaller diameter upper portion 7b and rear core 4. Accordingly, air gap (or space) defined between armature 6 and rear core 4 can be reduced, and thus, reduction in a magnetic force transmitted from rear core 4 to armature 6 can be suppressed or at least minimized.

[Easiness in Assembling Sleeve 7]

In the present invention, sleeve 7 is provided with a seal member holding recess (or annular recess) 7d of which diameter is smaller than that of smaller diameter upper portion 7b, and annular seal member 11 is snugly received in the seal member holding recess 7d in such a manner that its inner surface intimately contacts with the outer surface of the holding recess 7d. With such arrangement, it is possible to put sleeve 7 into rear core 4 together with annular seal member 11 kept put in the holding recess 7d.

[Suppression of Axial Deformation of Sleeve 7]

The axial length of sleeve 7 is set slightly smaller than an axial distance between bottom surface 1b of the thicker head part of solenoid housing 1 and the annular upper surface of larger diameter lower portion 3b of front core 3. Accordingly, even if front core 3 is applied with a stress caused by the hydraulic fluid from valve housing 8, sleeve 7 is suppressed from being strongly compressed between valve housing 1 and front core 3, and thus, axial deformation of sleeve 7 is suppressed.

[Suppression of Saturation of Magnetic Field]

In the present invention, sloped annular intermediate portion 7c of sleeve 7 is shaped to gradually increase its diameter as a distance to the larger diameter lower portion 7a reduces, and the lower end 4a of rear core 4 is tapered in such a manner that a diameter thereof gradually reduces as the distance from annular bottom surface 1b reduces. With such arrangement, the sloped annular intermediate portion 7c can be deeply inserted into rear core 4, and thus, the portion 7c can take a position much closer to rear core 4 that front core 3 installed in sleeve 7. Accordingly, a so-called overlapped degree between rear core 4 and front core 3 is increased thereby suppressing saturation of the magnetic field.

[Easiness in Assembling Rear Core 4]

In the present invention, rear core 4 is integral with solenoid housing 1. If desired, rear core 4 may be integral with sleeve 7. However, in this case, welding process becomes inevitably needed because the two elements 4 and 7 are made of different materials. That is, rear core 4 is made of a magnetic material and sleeve 7 is made of a non-magnetic material. However, in the present invention, there is no need of using such welding because the two elements 4 and 1 are made of the same material. More specifically, in the invention, an integral casing can be used for casting a single body including solenoid housing 1 and rear core 4.

[Stable Setting of Coil 2]

In the present invention, coil 2 is installed in coil receiving cylindrical space 1d of solenoid housing 1 through the upper and lower seal members 13 and 14 that are both kept compressed. Compressibility of lower seal member 14 is higher than that of upper seal member 13. Accordingly, coil 2 is stably set in the coil receiving cylindrical space 1d while being biased upward.

[Advantages of the Present Invention]

According to the present invention, there is provided a solenoid valve which comprises a solenoid housing 1 including longer outer and shorter inner cylindrical walls between which a coil receiving cylindrical space 1d is defined, the solenoid housing 1 having a head portion at one axial end thereof and an opened base portion at the other axial end thereof, the inner cylindrical wall being formed at an inner surface thereof with an annular recess 4b leaving a cylindrical outer wall that serves as a rear core 4; an annular coil 2 disposed in the coil receiving cylindrical space 1d, the annular coil 2 including cylindrical inner and outer surfaces that extend in parallel with an axis of the annular coil 2; a front core 3 disposed in the opened base portion of the solenoid housing 1, the front core 3 having a smaller diameter portion 3a projected into the inner cylindrical wall of the solenoid housing 1, the front core 3 being formed at the smaller diameter portion 3a thereof with an axially extending through bore 3c; a sleeve 7 including a smaller diameter portion 7b tightly received in the annular recess 4b of the inner cylindrical wall of the solenoid housing 1, a larger diameter portion 7a put between the cylindrical inner surface of the annular coil 2 and a cylindrical outer surface of the smaller diameter portion 3a of the front core 3 and a sloped annular intermediate portion 7c that extends between the smaller and larger diameter portions 7b and 7a; a plunger 5 axially slidably received in the axially extending through bore 3c of the front core 3, the plunger having a first portion projected into the smaller diameter portion 7b of the sleeve and a second portion projected outward; an armature 6 secured to the first portion of the plunger to move together therewith; a spring 12 biasing the plunger 5 toward the outside of the solenoid housing 1; and a valve unit actuated by the second portion of the plunger, the valve unit including a valve housing 8 connected to an outside of the front core 3, a spool 9 slidably received in the valve housing 8 and having an end that is in contact with the second portion of the plunger, and a spring 21 for biasing the spool 9 toward the second portion of the plunger.

With the arrangement of various elements of the above-mentioned solenoid valve of the invention, it is possible to provide the annular coil 2 with a quite simple shape. That is, the annular coil 2 is shaped to have cylindrical inner and outer surfaces that entirely extend in parallel with an axis of the annular coil 2. Simple shape of the coil 2 not only facilitates the work of winding a wire about a given axis but also brings about a high quality magnetic field produced by the coil 2. In addition to these merits, reduction in size and reduction in production cost of the coil 2 are obtained. Furthermore, even when the armature 6 approaches the front core 3, the increase of axial attraction force applied thereto can be controlled small, and thus, an accuracy in proportional characteristic of the solenoid valve can be increased.

If desired, the solenoid valve of the invention may have additional features in which the solenoid housing 1, the front core 3 and the rear core 4 are made of a magnetic material, the sleeve 7 is made of a non-magnetic material, the front core 3 has both an armature receiving recess 3e in the smaller diameter portion 3a to receive therein one end of the armature 6 and a tapered outer surface 3f that surrounds the armature receiving recess 3e, the diameter of the tapered outer surface 3f increasing as a distance from the head portion of the solenoid housing 1 increases, in which the rear core 4 is placed between the head portion of the solenoid housing 1 and the front core 3, the armature 6 forms a magnetic path for the magnetic field in cooperation with the cylindrical portion is of the solenoid housing 1, the front core 3 and the rear core 4, the valve housing 8 of the valve unit has an axially extending spool receiving bore portion 8a and an oil passage 8b exposed to the spool receiving bore portion 8a and communicating with the axially extending through bore 3c of the front core 3, and in which a first seal member 10 is operatively disposed between the smaller diameter portion 3a of the front core 3 and the larger diameter portion 7a of the sleeve 7, and a second seal member 11 is operatively disposed between the rear core 4 and the smaller diameter portion 7b of the sleeve 7.

With these features, the above-mentioned various advantages are much more assured.

If desired, the solenoid valve of the invention may have additional features in which the coil receiving cylindrical space 1d has near the opened base portion of the solenoid housing 1 an annular mouth 4a through which the annular coil 2 is insertable into the coil receiving cylindrical space 1d, in which the annular recess 4b of the rear core 4 has near the opened base portion of the solenoid housing 1a circular mouth through which the smaller diameter portion 7b of the sleeve 7 is insertable into the annular recess 4b and in which the sleeve 7 has near the opened base portion of the solenoid housing 1a circular mouth 7e through which the armature 6 and the smaller diameter portion 3a of the front core 3 are insertable into the sleeve 7.

With such features, all of coil 2, armature 6, sleeve 7 and front core 3 can be put into solenoid housing 1 in the same direction. This allows easy and simple work for assembling such parts 2, 6, 7 and 3 in solenoid housing 1.

If desired, the solenoid valve of the invention may have additional features in which the second seal member 11 is intimately compressed between an outer cylindrical surface of the smaller diameter portion 7b of the sleeve 7 and an inner cylindrical surface of the rear core 4.

With such features, even if a hydraulic fluid leaking from valve housing 8 is led into sleeve 7 and thus presses sleeve 7 against rear core 4 through second seal member 11, undesired deformation of sleeve 7 is suppressed.

If desired, the solenoid valve of the invention may have additional features in which an outer surface of the smaller diameter portion 7b of the sleeve 7 has near the head portion of the solenoid housing 1 an annular recess 7d in which the second seal member 11 is snugly held while intimately contacting to an outer surface of the annular recess 7d.

Due to provision of the annular recess 7d, mounting seal member 11 on sleeve 7 does not induce increase in distance between smaller diameter portion 7b of sleeve 7 and rear core 4. Accordingly, air gap (or space) defined between armature 6 and rear core 4 can be reduced, and thus, reduction in a magnetic force transmitted from rear core 4 to armature 6 can be suppressed or at least minimized.

If desired, the solenoid valve of the invention may have additional features in which the head portion of solenoid housing 1 has therein an annular bottom surface 1b to which one end of the sleeve 7 faces, the front core 3 has a larger diameter portion 3b that has an annular surface to which the other end of the sleeve 7 contacts, and an axial length of the sleeve 7 is smaller than a distance between the annular bottom surface 1b of the solenoid housing 1 and the annular surface of the front core 3.

With such features, even when the front core 3 is applied with a stress by a hydraulic fluid applied thereto, the sleeve 7 is prevented from being strongly compressed between valve housing 1 and front core 3, and thus, axial deformation of sleeve 7 is suppressed.

If desired, the solenoid valve of the invention may have additional features in which the sloped annular intermediate portion 7c of the sleeve 7 is shaped to gradually increase its diameter as a distance to the larger diameter portion 7a reduces, and one end of the rear core 4, which faces the sloped annular intermediate portion 7c, is so tapered that a diameter thereof gradually reduces as a distance from the head portion of the solenoid housing 1 reduces.

With such features, the sloped annular intermediate portion 7c can be deeply inserted into rear core 4, and thus, front core 3 in sleeve 7 can take a position much closer to rear core 4. Accordingly, a so-called overlapped degree between rear core 4 and front core 3 is increased thereby suppressing saturation of the magnetic field.

If desired, the solenoid valve of the present invention may have an additional feature in which the rear core 4 is integral with the solenoid housing 1.

With such feature, there is no need of employing a troublesome welding processing.

If desired, the solenoid valve of the invention may have additional features in which a third seal member 13 is intimately compressed between one axial end of the annular coil 2 and a bottom of the coil receiving cylindrical space 1d of the solenoid housing 1 and a fourth seal member 14 is intimately compressed between the other axial end of the annular coil 2 and the larger diameter portion 3b of the front core 3, and in which compressibility of the third seal member 13 is different from that of the fourth seal member 14.

With such features, coil 2 can be stably held in the coil receiving cylindrical space 1d while being biased in one direction.

According to the present invention, there is further provided a solenoid which comprises a solenoid housing 1 including longer outer and shorter inner cylindrical walls between which a coil receiving cylindrical space 1d is defined, the solenoid housing 1 having a head portion at one axial end thereof and an opened base portion at the other axial end thereof, the inner cylindrical wall being formed at an inner surface thereof with an annular recess 4b leaving a cylindrical outer wall that serves as a rear core 4; an annular coil 2 disposed in the coil receiving cylindrical space 1d, the annular coil 2 including cylindrical inner and outer surfaces that extend in parallel with an axis of the annular coil 2; a front core 3 disposed in the opened base portion of the solenoid housing 1 and having a smaller diameter portion 3a projected into the inner cylindrical wall of the solenoid housing 1, the front core 3 being formed at the smaller diameter portion 3a thereof with an axially extending through bore 3c; a sleeve 7 including a smaller diameter portion 7b tightly received in the annular recess 4b of the inner cylindrical wall of the solenoid housing 1, a larger diameter portion 7a put between the cylindrical inner surface of the annular coil 2 and a cylindrical outer surface of the smaller diameter portion 3a of the front core 3 and a sloped annular intermediate portion 7c that extends between the smaller and larger diameter portions 7b and 7a; a plunger 5 axially slidably received in the axially extending through bore 3c of the front core 3, the plunger having a first portion projected into the smaller diameter portion 7b of the sleeve 7 and a second portion projected outward; an armature 6 secured to the first portion of the plunger 5 to move together therewith; and a spring 12 biasing the plunger 5 toward the outside of the solenoid housing 1.

With the arrangement of various elements of the above-mentioned solenoid of the invention, it is possible to provide the annular coil 2 with a quite simple shape. That is, the annular coil 2 is shaped to have cylindrical inner and outer surfaces that entirely extend in parallel with an axis of the annular coil 2. Simple shape of the coil 2 not only facilitates the work of winding a wire about a given axis but also brings about a high quality magnetic field produced by the coil 2. In addition to these merits, reduction in size and reduction in production cost of the coil 2 are obtained.

According to the present invention, there is further provided a hydraulic power system used in a power steering system for a motor vehicle, the hydraulic power system comprising a variable capacity pump 44 for feeding a power cylinder 37 with a pressurized hydraulic fluid to assist a steering work applied to a steering wheel, the variable capacity pump 44 including a pump housing 49, a drive shaft 50 rotatably held in the pump housing 49, a cam ring 47 movably received in a pump element receiving recess 48 formed in the pump housing 49, a rotor 45 arranged in the cam ring 47 and driven by the drive shaft 50, vanes axially movably held by the rotor 45 while causing tops of the vanes to slidably contact with an inner surface of the cam ring 47, and a solenoid valve 51 that controls the eccentricity of the cam ring 47, the solenoid valve 51 including: a solenoid housing 1 including longer outer and shorter inner cylindrical walls between which a coil receiving cylindrical space 1d is defined, the solenoid housing 1 having a head portion at one axial end thereof and an opened base portion at the other axial end thereof, the inner cylindrical wall being formed at an inner surface thereof with an annular recess 4b leaving a cylindrical outer wall that serves as a rear core 4; an annular coil 2 disposed in the coil receiving cylindrical space 1d, the annular coil 2 including cylindrical inner and outer surfaces that extend in parallel with an axis of the annular coil 2; a front core 3 disposed in the opened base portion of the solenoid housing 1, the front core 3 having a smaller diameter portion 3a projected into the inner cylindrical wall of the solenoid housing 1, the front core 3 being formed at the smaller diameter portion 3a thereof with an axially extending through bore 3c; a sleeve 7 including a smaller diameter portion 7b tightly received in the annular recess 4b of the inner cylindrical wall of the solenoid housing 1, a larger diameter portion 7a put between the cylindrical inner surface of the annular coil 2 and a cylindrical outer surface of the smaller diameter portion 3a of the front core 3 and a sloped annular intermediate portion 7c that extends between the smaller and larger diameter portions 7b and 7a; a plunger 5 axially slidably received in the axially extending through bore 3c of the front core 3, the plunger having a first portion projected into the smaller diameter portion 7b of the sleeve and a second portion projected outward; an armature 6 secured to the first portion of the plunger to move together therewith; a spring 12 biasing the plunger 5 toward the outside of the solenoid housing 1; and a valve unit actuated by the second portion of the plunger, the valve unit including a valve housing 8 connected to an outside of the front core 3, a spool 9 slidably received in the valve housing 8 and having an end that is in contact with the second portion of the plunger, and a spring 21 for biasing the spool 9 toward the second portion of the plunger.

With the arrangement of various elements as mentioned hereinabove, it is possible to provide coil 2 with a simple shape. That is, coil 2 has inner and outer cylindrical surfaces that are coaxial and entirely extend in parallel with the axis of coil 2. Simple construction of coil 2 not only facilitates the work for winding a wire but also brings about increase in wire winding accuracy. Of course, reduction in size and reduction in production cost are also obtained. Furthermore, even when armature 6 comes near front core 3, the rate of increase of an axial attraction force applied to them can be controlled small, and thus, the proportional characteristic of solenoid valve 51 is improved.

The entire contents of Japanese Patent Application 2011-165128 filed Jul. 28, 2011 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A solenoid valve comprising:
a solenoid housing including a longer outer cylindrical wall and a shorter inner cylindrical wall between which a coil receiving cylindrical space is defined, the solenoid housing having a head portion at one axial end thereof and an opened base portion at another axial end thereof, the inner cylindrical wall being formed at an inner surface thereof with an annular recess leaving a cylindrical wall that serves as a rear core;
an annular coil disposed in the coil receiving cylindrical space, the annular coil including a cylindrical inner surface and a cylindrical outer surface that extend in parallel with an axis of the annular coil;
a front core disposed in the opened base portion of the solenoid housing, the front core having a smaller diameter portion projected into the inner cylindrical wall of the solenoid housing, the front core being formed at the smaller diameter portion thereof with an axially extending through bore;
a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions of the sleeve;
a plunger axially slidably received in the axially extending through bore of the front core, the plunger having a first portion projected into the smaller diameter portion of the sleeve and a second portion projected outward;
an armature secured to the first portion of the plunger to move together therewith;
a spring biasing the plunger toward an outside of the solenoid housing; and
a valve unit actuated by the second portion of the plunger, the valve unit including a valve housing connected to an outside of the front core, a spool slidably received in the valve housing and having an end that is in contact with the second portion of the plunger, and a spring for biasing the spool toward the second portion of the plunger,
wherein the solenoid housing, the front core and the rear core are made of a magnetic material,
wherein the sleeve is made of a non-magnetic material,
wherein the front core has both an armature receiving recess in the smaller diameter portion thereof to receive therein one end of the armature and a tapered outer surface that surrounds the armature receiving recess, a diameter of the tapered outer surface increasing as a distance from the head portion of the solenoid housing increases,
wherein the rear core is placed between the head portion of the solenoid housing and the front core,
wherein the armature forms a magnetic path for a magnetic field in cooperation with the cylindrical walls of the solenoid housing, the front core and the rear core,
wherein the valve housing of the valve unit has an axially extending spool receiving bore portion and an oil passage exposed to the spool receiving bore portion and communicating with the axially extending through bore of the front core, and
wherein a first seal member is operatively disposed between the smaller diameter portion of the front core and the larger diameter portion of the sleeve, and a second seal member is operatively disposed between the rear core and the smaller diameter portion of the sleeve.

2. A solenoid valve as claimed in claim 1,
wherein the coil receiving cylindrical space has near the opened base portion of the solenoid housing an annular mouth through which the annular coil is insertable into the coil receiving cylindrical space,
wherein the annular recess of the inner cylindrical wall of the solenoid housing has near the opened base portion of the solenoid housing a circular mouth through which the smaller diameter portion of the sleeve is insertable into the annular recess, and
wherein the sleeve has near the opened base portion of the solenoid housing a circular mouth through which the armature and the smaller diameter portion of the front core are insertable into the sleeve.

3. A solenoid valve as claimed in claim 2, wherein the second seal member is intimately compressed between an outer cylindrical surface of the smaller diameter portion of the sleeve and the inner surface of the inner cylindrical wall of the solenoid housing.

4. A solenoid valve as claimed in claim 3, wherein the outer cylindrical surface of the smaller diameter portion of the sleeve has near the head portion of the solenoid housing an annular recess in which the second seal member is snugly held while intimately contacting an outer surface of the annular recess.

5. A solenoid valve as claimed in claim 1, wherein the head portion of the solenoid housing has therein an annular bottom surface to which one end of the sleeve faces, and
wherein the front core has a larger diameter portion that has an annular surface to which another end of the sleeve contacts, and an axial length of the sleeve is smaller than a distance between the annular bottom surface of the solenoid housing and the annular surface of the front core.

6. A solenoid valve as claimed in claim 1, wherein the sloped annular intermediate portion of the sleeve is shaped to gradually increase its diameter as a distance to the larger diameter portion of the sleeve reduces, and wherein one end of the rear core, which faces the sloped annular intermediate portion, is so tapered that a diameter thereof gradually reduces as a distance from the head portion of the solenoid housing reduces.

7. A solenoid valve as claimed in claim 1, wherein the rear core is integral with the solenoid housing.

8. A solenoid valve as claimed in claim 1, wherein a third seal member is intimately compressed between one axial end of the annular coil and a bottom of the coil receiving cylindrical space of the solenoid housing, and wherein a fourth seal member is intimately compressed between another axial end of the annular coil and a larger diameter portion of the front core, and wherein compressibility of the third seal member is different from that of the fourth seal member.

9. A solenoid comprising:
a solenoid housing including a longer outer cylindrical wall and a shorter inner cylindrical wall between which a coil receiving cylindrical space is defined, the solenoid housing having a head portion at one axial end thereof and an opened base portion at another axial end thereof, the inner cylindrical wall being formed at an inner surface thereof with an annular recess leaving a cylindrical wall that serves as a rear core;
an annular coil disposed in the coil receiving cylindrical space, the annular coil including a cylindrical inner surface and a cylindrical outer surface that extend in parallel with an axis of the annular coil;
a front core disposed in the opened base portion of the solenoid housing and having a smaller diameter portion projected into the inner cylindrical wall of the solenoid housing, the front core being formed at the smaller diameter portion thereof with an axially extending through bore;
a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions of the sleeve;
a plunger axially slidably received in the axially extending through bore of the front core, the plunger having a first portion projected into the smaller diameter portion of the sleeve and a second portion projected outward;
an armature secured to the first portion of the plunger to move together therewith; and
a spring biasing the plunger toward an outside of the solenoid housing,
wherein the solenoid housing, the front core and the rear core are made of a magnetic material,
wherein the sleeve is made of a non-magnetic material,
wherein the front core has both an armature receiving recess in the smaller diameter portion thereof to receive therein one end of the armature and a tapered outer surface that surrounds the armature receiving recess, the diameter of the tapered outer surface increasing as a distance from the head portion of the solenoid housing increases, wherein the rear core is placed between the head portion of the solenoid housing and the front core, the armature forms a magnetic path for a magnetic field in cooperation with cylindrical walls of the solenoid housing the front core and the rear core, and wherein a first seal member is operatively disposed between the smaller diameter portion of the front core and the larger diameter portion of the sleeve and a second seal member is operatively disposed between the rear core and the smaller diameter portion of the sleeve.

10. A solenoid as claimed in claim 9, wherein the coil receiving cylindrical space has near the opened base portion of the solenoid housing an annular mouth through which the annular coil is insertable into the coil receiving cylindrical space, wherein the annular recess of the inner cylindrical wall of the solenoid housing has near the opened base portion of the solenoid housing a circular mouth through which the smaller diameter portion of the sleeve is insertable into the annular recess, and wherein the sleeve has near the opened base portion of the solenoid housing a circular mouth through which the armature and the smaller diameter portion of the front core are insertable into the sleeve.

11. A solenoid as claimed in claim 10, wherein the second seal member is intimately compressed between an outer cylindrical surface of the smaller diameter portion of the sleeve and the inner cylindrical surface of the inner cylindrical wall of the solenoid housing.

12. A solenoid as claimed in claim 11, wherein the outer cylindrical surface of the smaller diameter portion of the sleeve has near the head portion of the solenoid housing an annular recess in which the second seal member is snugly held while intimately contacting an outer surface of the annular recess.

13. A solenoid as claimed in claim 9, wherein the head portion of the solenoid housing has therein an annular bottom surface to which one end of the sleeve faces, the front core has a larger diameter portion that has an annular surface to which another end of the sleeve contacts, and wherein an axial length of the sleeve is smaller than a distance between the annular bottom surface of the solenoid housing and the annular surface of the front core.

14. A solenoid as claimed in claim 9, wherein the sloped annular intermediate portion of the sleeve is shaped to gradually increase its diameter as a distance to the larger diameter portion of the sleeve reduces, and wherein one end of the rear core, which faces the sloped annular intermediate portion, is so tapered that a diameter thereof gradually reduces as a distance from the head portion of the solenoid housing reduces.

15. A solenoid as claimed in claim 9, wherein the rear core is integral with the solenoid housing.

16. A solenoid as claimed in claim 9, wherein a third seal member is intimately compressed between one axial end of the annular coil and a bottom of the coil receiving cylindrical space of the solenoid housing, and wherein a fourth seal member is intimately compressed between another axial end of the annular coil and a larger diameter portion of the front core, and wherein compressibility of the third seal member is different from that of the fourth seal member.

17. A hydraulic power system used in a steering power steering system for a motor vehicle, comprising:

a variable capacity pump for feeding a power cylinder with a pressurized hydraulic fluid to assist a steering work applied to a steering wheel, the variable capacity pump including a pump housing, a drive shaft rotatably held in the pump housing, a cam ring movably received in a pump element receiving recess formed in the pump housing, a rotor arranged in the cam ring and driven by the drive shaft, vanes axially movably held by the rotor while causing tops of the vanes to slidably contact with an inner surface of the cam ring, and a solenoid valve that controls an eccentricity of the cam ring, the solenoid valve including:

a solenoid housing including a longer outer cylindrical wall and a shorter inner cylindrical wall between which a coil receiving cylindrical space is defined, the solenoid housing having a head portion at one axial end thereof and an opened base portion at the other axial end thereof, the inner cylindrical wall being formed at an inner surface thereof with an annular recess leaving a cylindrical wall that serves as a rear core;

an annular coil disposed in the coil receiving cylindrical space, the annular coil including a cylindrical inner surface and a cylindrical outer surface that extend in parallel with an axis of the annular coil;

a front core disposed in the opened base portion of the solenoid housing, the front core having a smaller diameter portion projected into the inner cylindrical wall of the solenoid housing, the front core being formed at the smaller diameter portion thereof with an axially extending through bore;

a sleeve including a smaller diameter portion tightly received in the annular recess of the inner cylindrical wall of the solenoid housing, a larger diameter portion put between the cylindrical inner surface of the annular coil and a cylindrical outer surface of the smaller diameter portion of the front core and a sloped annular intermediate portion that extends between the smaller and larger diameter portions of the sleeve;

a plunger axially slidably received in the axially extending through bore of the front core, the plunger having a first portion projected into the smaller diameter portion of the sleeve and a second portion projected outward;

an armature secured to the first portion of the plunger to move together therewith;

a spring biasing the plunger toward an outside of the solenoid housing; and a valve unit actuated by the second portion of the plunger, the valve unit including a valve housing connected to an outside of the front core, a spool slidably received in the valve housing and having an end that is in contact with the second portion of the plunger, and a spring for biasing the spool toward the second portion of the plunger, wherein the solenoid housing, the front core and the rear core are made of a magnetic material, wherein the sleeve is made of a non-magnetic material, wherein the front core has both an armature receiving recess in the smaller diameter portion thereof to receive therein one end of the armature and a tapered outer surface that surrounds the armature receiving recess, a diameter of the tapered outer surface increasing as a distance from the head portion of the solenoid housing increases, wherein the rear core is placed between the head portion of the solenoid housing and the front core, wherein the armature forms a magnetic path for a magnetic field in cooperation with the cylindrical portion of the solenoid housing, the front core and the rear core, wherein the valve housing of the valve unit has an axially extending spool receiving bore portion and an oil passage exposed to the spool receiving bore portion and communicating the axially extending through bore of the front core, and wherein a first seal member is operatively disposed between the smaller diameter portion of the front core and the larger diameter portion of the sleeve, and a second seal member is operatively disposed between the rear core and the smaller diameter portion of the sleeve.

* * * * *